W. H. SWARTZ.
CLUTCH.
APPLICATION FILED APR. 5, 1910.

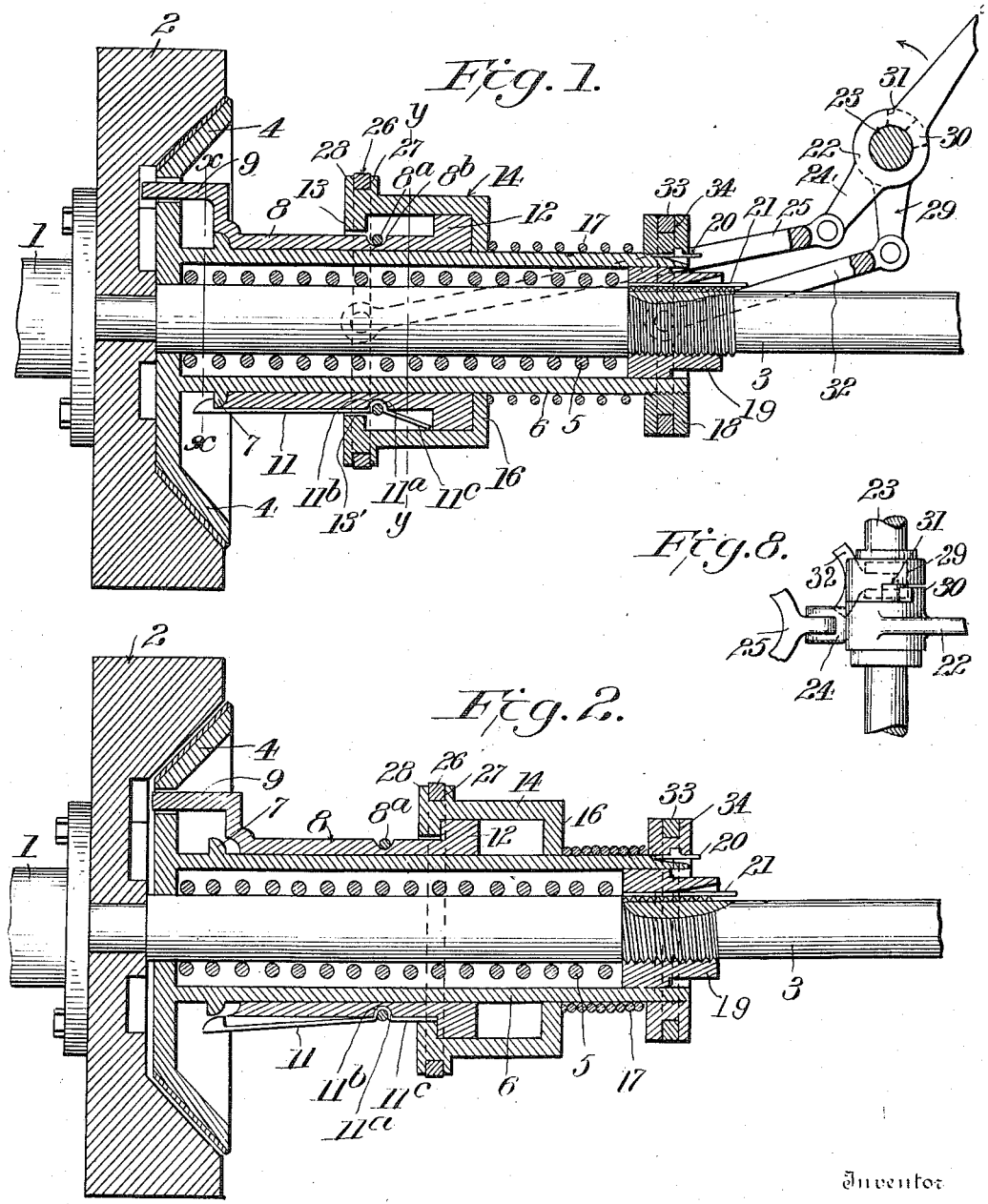

995,043.

Patented June 13, 1911.

2 SHEETS—SHEET 2.

Witnesses
C. H. Walker,
L. E. Fischer.

Inventor
Will H. Swartz
By Edson Bro's
Attorneys.

UNITED STATES PATENT OFFICE.

WILLIAM H. SWARTZ, OF YORK, PENNSYLVANIA.

CLUTCH.

995,043.

Specification of Letters Patent. Patented June 13, 1911.

Application filed April 5, 1910. Serial No. 553,630.

*To all whom it may concern:*

Be it known that I, WILLIAM H. SWARTZ, a citizen of the United States, residing at York, in the county of York and State of Pennsylvania, have invented certain new and useful Improvements in Clutches; and I do hereby declare the following to be a full, clear, and exact description of the invention, such as will enable others skilled in the art to which it appertains to make and use the same.

My invention relates to clutches especially designed for automobiles.

The clutch embodying the present invention belongs to the type which combines a positive locking member with a friction clutch member. The clutch now generally in use depends entirely on its friction grip to drive the load.

The positive locking device is provided to obviate the trouble caused by the friction clutch slipping when not desired. This was often caused by oil accidentally getting on the leather facing or bushing of the cone clutch or by the face of said clutch wearing smooth with long usage. Even when the positive locking member is employed, the projections thereon and the lugs or sides of the notches which are engaged by said projections are apt to wear to a taper or bevel and, when this occurs, the vibrations of the engine and the jolts caused by running over rough roads will cause said projections to back themselves out of said sockets or away from said lugs, a little at a time, until they are eventually released all together and the positive locking device rendered useless.

The principal object of this invention is to prevent the positive locking device from becoming disengaged in the manner just described. In other words, it is my aim to positively secure the locking member in its locking position.

Another object is to provide for automatically releasing said positive securing device when it is desired to withdraw the locking member.

Other objects are to generally simplify the construction of the clutch, reduce the cost of manufacture thereof, and render it more efficient and durable.

My invention consists of the features of construction and combinations of parts hereinafter described and specified in the claims.

Figure 3:
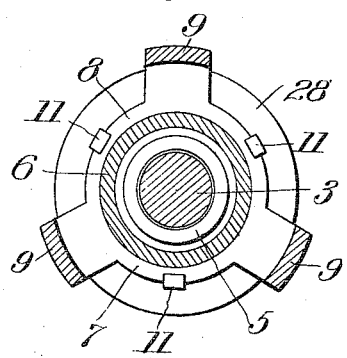
Figure 4:
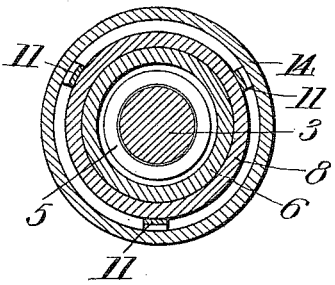
Figure 5:
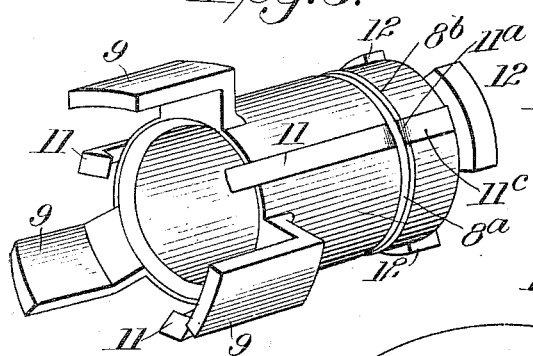
Figure 6:
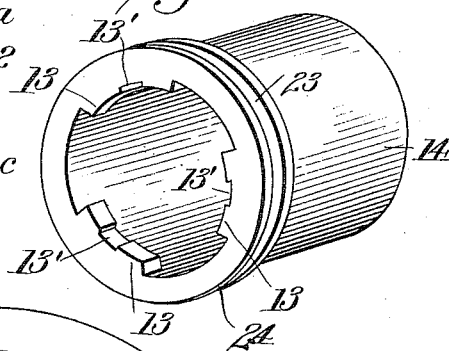
Figure 1:
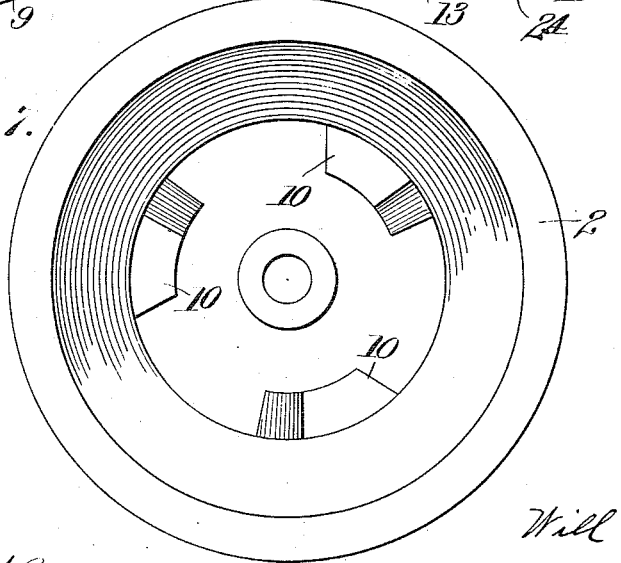

In the accompanying drawings: Figure 1 is a central longitudinal sectional view of a clutch embodying my invention and showing the positive securing and locking member in operative connection. Fig. 2 is a similar view showing said locking member withdrawn but the friction clutch in driving contact. Fig. 3 is a cross section on the line $x$—$x$ of Fig. 1. Fig. 4 is a cross section on the line $y$—$y$ of Fig. 1. Figs. 5 and 6 are perspective views, respectively, of the two parts of the positive locking member. Fig. 7 is a detailed view of the inside face of the stationary member of the friction clutch, and Fig. 8 is a detailed view of the operating mechanism for the positive locking member.

Referring more particularly to the drawings, 1 designates the driving shaft and 2 the non-sliding member of the cone clutch which is rigidly secured to said shaft. On the driven shaft 3 the other member 4 of the cone clutch is mounted to slide, being normally pressed into contact with the member 2 by a coiled spring 5 arranged in a chamber formed within the sleeve 6 of the member 4. Said sleeve is provided with a circumferential rib or flange 7 on its outer surface for the purpose to be hereinafter explained.

The positive locking member is made in two parts or sleeves, one 8 being provided with projections or pins 9 extending through suitable passages in the cone clutch member 4 and adapted to engage lugs 10 on the inner face of the other member 2 of said cone clutch. The sleeve 8 also carries a plurality of spring catches 11, three being shown, disposed alternately of the pins or projections 9. These springs are secured to the sleeve 8 by sunken hinge joints consisting of rounded depressions $11^a$ bent in the springs and engaging suitably formed sockets $11^b$ in the outer surface of said sleeve. Said depressions are retained in their sockets by a wire ring $8^a$ seated in a groove $8^b$, as illustrated in Fig. 5. The inner ends of the spring catches, which are designed to engage the flange 7, are straight, but their outer ends are turned outward, as at $11^c$.

At the rear end of the sleeve 8 are formed spaced apart outward projections 12 which are adapted to coöperate with similar spaced apart inward projections 13 on the forward end of the other member or sleeve 14 of the positive locking device, in order to permit the latter member to be slipped on to the sleeve 8 and be locked thereon by turning the projections 13 out of alinement with the spaces between the projections 12. Notches 13¹ are formed in the faces of the projections 13 of a shape and size to fit over the spring catches 11. Said spring catches are so positioned with respect to the projections 12 that, when in engagement with said notches 13¹, they serve to lock the part 14 against turning so as to escape the projections 12. The result is that when the part 14 is slipped on to the sleeve 8 and turned until the projections 13 are opposite the projections 12, the spring catches snap into place in the notches 13¹ thereby effectually securing the parts of the positive locking device together. The part 14 is also provided with an inwardly extending flange 16 at its outer end which fits down over the projections 12 on the part 8 when the former is advanced upon the latter part. A spring 17, interposed between said flange 16 and an adjusting collar 18, normally holds the part 14 in its advanced position. The collar 18 and the adjusting nut 19 against which the spring 5 abuts are locked against turning on the sleeve 6 and shaft 3, respectively, by spring keys 20 and 21 engaging key ways or slots in said sleeve and shaft.

The operating mechanism for the positive locking member comprises a hand or foot lever 22 mounted on a shaft 23 and having a depending arm 24 connected by a link 25 with a yoke 26 fitted in a groove 27 in an outwardly extending flange 28 on the part 14. Another arm 29 is mounted independently on the shaft 23 but has pin and slot connection, as at 30 and 31 in Fig. 8, with the arm 24 so that, after the lever has been moved in the direction of the arrow in Fig. 1 a distance sufficient to disengage the positive locking member, said arm 29 will be moved also, with the result that the friction clutch member 4 is withdrawn from its supplementary member 2 by means of the link 32 connecting the arm 29 to a yoke 33 fitted in a groove 34 in the collar 18. By this arrangement it is possible for the operator to actuate the positive locking member independently of the friction clutch, and for him to also regulate said friction clutch with the same lever whereby the slipping of the clutch may be very conveniently accomplished when desired as, for example, in climbing a hill.

As illustrated in Fig. 1, the normal positions of the friction clutch and locking member are in driving connection with the stationary member 2 of the clutch. When in this position, the part 14 is telescoped or advanced beyond the hinges of the catches on the part 8 of the positive locking member and said spring catches 11 are held in engagement with the rib or flange 7 on the sleeve 6 of the cone clutch member 4. When it is desired to disconnect the positive locking device, the lever 22 is actuated, as already explained, to retract the part 14 against the spring 17. As this part 14 is moved back along the sleeve 8, the spring catches are released from the rib 7 by the projections 13 engaging the outwardly bent ends 11ᶜ of said catches allowing said sleeve to be moved back when the projections 13 come in contact with the projections 12 thereby disconnecting the pins 9 from the lugs 10 on the stationary clutch member. The clutch is then in the position illustrated in Fig. 2 where it is capable of having the friction clutch used independently of the positive locking device. A further retractory movement of the yoke will cause the friction clutch member 4 to be withdrawn from the stationary member 2, as already explained, so that the driven shaft will be entirely disconnected from the driving shaft. When the pressure is released from the lever, the spring 5 will first advance the cone clutch member 4 into engagement with the stationary member 2. The spring 17 will then advance the part 14 upon the part 8 depressing the spring catches 11. When the flange 16 comes into contact with the projections 12, the expansion of the spring 17 will cause the part 8 to be advanced bringing the pins 9 into operative engagement with the lugs 10 on the stationary clutch member and simultaneously snapping the spring catches 11 over the rib 7, as illustrated in dotted lines in Fig. 1. The friction clutch member is then positively locked to the member 2 by means of the pins 9 and said pins are prevented from slipping back out of engagement with the lugs 10 by means of the spring catches.

I claim:

1. In a clutch, the combination, with stationary and longitudinally movable friction clutch members, of a positive locking device for preventing said friction clutch members from slipping, and means to automatically and unyieldingly secure said positive locking device in operative position when the friction clutch members are in driving connection.

2. In a clutch, the combination, with stationary and longitudinally movable friction clutch members, of a positive locking device for preventing said friction clutch members from slipping, and means to automatically and unyieldingly secure said positive locking device to the movable friction clutch member when said locking device is in operative position.

3. In a clutch, the combination, with stationary and longitudinally movable friction clutch members, of a positive locking device for preventing said friction clutch members from slipping, means to unyieldingly secure said positive locking device in operative position when the friction clutch members are in driving connection, and means to automatically release said securing means as said locking device is withdrawn.

4. In a clutch, the combination, with stationary and longitudinally movable friction clutch members, of a positive locking device for preventing said friction clutch members from slipping, means to unyieldingly secure said positive locking device to the movable friction clutch member when said locking device is in operative position, and means to automatically release said securing means as said locking device is withdrawn.

5. In a clutch, the combination, with stationary and longitudinally movable friction clutch members, said movable member having a projection thereon, of a positive locking device for preventing said friction clutch members from slipping, and catches carried by said locking device and adapted to engage said projection on the movable friction clutch member when said locking device is in operative position whereby the latter is unyieldingly secured to said movable friction clutch member.

6. In a clutch, the combination, with stationary and longitudinally movable friction clutch members, said movable member having a projection thereon, of a positive locking device for preventing said friction clutch members from slipping, catches carried by said locking device and adapted to engage said projection on the movable friction clutch member when said locking device is in operative position whereby the latter is unyieldingly secured to said movable friction clutch member, and means to automatically release said catches in the operation of withdrawing said locking device.

7. In a clutch, the combination, with stationary and longitudinally movable friction clutch members, said movable member having a projection thereon, of a positive locking device for preventing said friction clutch members from slipping, and catches carried by said locking device and adapted to automatically engage said projection on the movable friction clutch member when said locking device is in operative position whereby the latter is unyieldingly secured to said movable friction clutch member.

8. In a clutch, the combination, with stationary and longitudinally movable friction clutch members, of a positive locking device having pins extending through the movable friction clutch member, lugs on the stationary member of the friction clutch adapted to be engaged by the pins of the locking device for preventing said friction clutch members from slipping, and means to automatically and unyieldingly secure said positive locking device in operative position when the friction clutch members are in driving connection.

9. In a clutch, the combination, with stationary and longitudinally movable friction clutch members, of a positive locking device having pins extending through the movable friction clutch member, lugs on the stationary member of the friction clutch adapted to be engaged by the pins of the locking device for preventing said friction clutch members from slipping, and means to automatically and unyieldingly secure said positive locking device to the movable friction clutch member when said locking device is in operative position.

10. In a clutch, the combination, with stationary and longitudinally movable friction clutch members, of a positive locking device having pins extending through the movable friction clutch member, lugs on the stationary member of the friction clutch adapted to be engaged by the pins of the locking device for preventing said friction clutch members from slipping, means to unyieldingly secure said positive locking device in operative position when the friction clutch members are in driving connection, and means to automatically release said securing means as said locking device is withdrawn.

11. In a clutch, the combination, with stationary and longitudinally movable friction clutch members, said movable member having a projection thereon, of a positive locking device having pins extending through said movable friction clutch member, lugs on the stationary member of the friction clutch adapted to be engaged by the pins of the locking device for preventing said friction clutch members from slipping, catches carried by said locking device and adapted to engage said projection on the movable friction clutch member when said locking device is in operative position, and means to automatically release said catches in the operation of withdrawing said locking device.

12. In a clutch, the combination, with stationary and longitudinally movable friction clutch members, said movable member having a projection thereon, of a positive locking device having pins extending through said movable friction clutch member, lugs on the stationary member of the friction clutch adapted to be engaged by the pins of the locking device for preventing said friction clutch members from slipping, and catches carried by said locking device and adapted to automatically engage said projection on the movable friction clutch member when said locking device is in operative position.

13. In a clutch, the combination, with stationary and longitudinally movable friction clutch members, of a positive locking device comprising two telescoping parts, a projection on the movable friction clutch member, and spring catches secured to the inner part of the locking device and adapted to be pressed into engagement with said projection for unyieldingly securing said inner part of the locking device to the movable friction clutch member when the outer part of said locking device is advanced upon the inner part thereof.

14. In a clutch, the combination, with stationary and longitudinally movable friction clutch members, of a positive locking device comprising two telescoping parts, pins on the inner part extending through the movable member of the friction clutch, lugs on the stationary friction clutch member adapted to be engaged by said pins for preventing said friction clutch members from slipping, a projection on the movable friction clutch member, and spring catches secured to the inner part of the locking device and adapted to be pressed into engagement with said projection for unyieldingly securing said inner part of the locking device to the movable friction clutch member when the outer part of said locking device is advanced upon the inner part thereof.

15. In a clutch, the combination, with stationary and longitudinally movable friction clutch members, of a positive locking device comprising two telescoping parts, a projection on the movable friction clutch member, spring catches secured to the inner part of the locking device and adapted to be pressed into engagement with said projection for unyieldingly securing said inner part of the locking device to the movable friction clutch member when the outer part of said locking device is advanced upon the inner part thereof, and means for automatically releasing said securing means as the outer part of said locking device is withdrawn.

16. In a clutch, the combination, with friction clutch members, and a rib on the movable one of said members, of a positive locking device comprising two telescoping parts, spring catches secured to the inner part and adapted to be pressed into engagement with said rib when the outer part is advanced upon said inner part, means to slide said outer part and means to retain said outer part upon the inner part whereby the withdrawal of said outer part will first release said catch and then retract the locking device.

17. In a clutch, the combination, with friction clutch members and a rib on the movable one of said members, of a positive locking device for the purpose specified comprising two telescoping parts, the inner member carrying spring catches adapted to engage said rib for holding the locking device in operative position, outward projections on the inner part, inward projections on the outer part adapted to permit the introduction of said outer part upon the inner part but capable of preventing them from being disconnected after one of said parts is turned with respect to the other, and means to slide said outer part whereby the catches are depressed into engagement with said rib or released therefrom and the locking device withdrawn.

18. In a clutch, the combination, with friction clutch members and a rib on the movable one of said members, of a positive locking device comprising two telescoping parts, the inner member carrying spring catches adapted to engage said rib for holding the locking device in operative position, outward projections on the inner part, inward projections on the outer part adapted to permit the introduction of said outer part upon the inner part but capable of preventing them from being disconnected after one of said parts is turned with respect to the other, the inward projections on said outer part being provided with notches adapted to fit said catches for the purpose specified, and means to slide said outer part whereby the catches are depressed into engagement with said rib or released therefrom and the locking device withdrawn.

19. In a clutch, the combination, with a driving shaft, and a stationary clutch member thereon, of a driven shaft, a movable friction clutch member splined thereon and having a sleeve spaced away from said latter shaft forming a chamber around the same, an adjusting nut on said driven shaft and extending within said sleeve, a spring arranged in said chamber between said nut and the movable friction clutch member and adapted to normally hold the latter in contact with the stationary clutch member, a positive locking member having pins adapted to extend through the movable clutch member and positively engage the stationary clutch member, an adjusting collar on said sleeve, a spring interposed between said collar and the locking device and normally holding the latter in operative position, and means for unyieldingly securing said locking device in operative position.

20. In a clutch, the combination, with a driving shaft and a stationary clutch member thereon, of a driven shaft, a movable friction clutch member splined thereon and having a sleeve spaced away from said latter shaft forming a chamber around the same, an adjusting nut on said driven shaft and extending within said sleeve, a spring arranged in said chamber between said nut and the movable friction clutch member and adapted to normally hold the latter in contact with the stationary clutch member, a rib on the outer surface of said sleeve, a positive locking member having pins adapted to extend through the movable clutch member and positively engage the stationary clutch member, an adjusting collar on said sleeve, a spring interposed between said collar and the locking device and normally holding the latter in operative position, catches on said locking device adapted to engage said rib for the purpose specified, and means to automatically release said catches in the operation of withdrawing said locking device.

21. In a clutch, the combination, with friction clutch members, and a rib on the movable one of said members, of a positive locking device comprising two telescoping parts and spring catches pivoted on the inner part by means of sunken hinges, the outer ends of said catches being turned outwardly, and means on the outer part of the positive locking device adapted to hold said catches in operative position when advanced beyond said sunken hinges and also adapted to disengage said catches from said rib when moved back into engagement with said bent ends of said catches.

22. In a clutch, the combination, with friction clutch members, and a rib on the movable one of said members, of a positive locking device comprising two telescoping parts and spring catches pivoted on the inner part by means of sunken hinges composed of rounded depressions in the catches fitted in sockets in said inner part, and a wire ring seated in a circumferential groove connecting said sockets, the outer ends of said catches being turned outwardly, and means on the outer part of the positive locking device adapted to hold said catches in operative position when advanced beyond said sunken hinges and also adapted to disengage said catches from said rib when moved back into engagement with said bent ends of said catches.

23. In a clutch, the combination, with stationary and movable friction clutch members, of a positive locking device, an operating lever, and means for independently controlling said movable friction clutch member and said positive locking device by manipulating said lever which comprises an arm rigidly connected to said lever, another arm independently pivoted on the fulcrum of said lever and having pin and slot connection therewith, and separate links and yokes connecting said arms with the positive locking device and the movable friction clutch member, respectively.

In testimony whereof, I affix my signature, in presence of two witnesses.

WILL. H. SWARTZ.

Witnesses:
ALLEN H. POTTS,
J. A. HILLEARY, Jr.